(12) United States Patent
Beesley

(10) Patent No.: US 6,470,988 B1
(45) Date of Patent: Oct. 29, 2002

(54) DIFFERENTIAL ASSEMBLY WITH SYNCHRONIZING PRELOAD

(75) Inventor: Peter Alfred Beesley, Fort Wayne, IN (US)

(73) Assignee: Spicer Technology, Inc., Fort Wayne, IN (US)

(*) Notice: Subject to any disclaimer, the term of this patent is extended or adjusted under 35 U.S.C. 154(b) by 0 days.

(21) Appl. No.: 09/620,974

(22) Filed: Jul. 20, 2000

(51) Int. Cl.[7] .................... B60K 17/354; F16H 48/20
(52) U.S. Cl. ........................... 180/245; 475/235
(58) Field of Search ......................... 475/240, 235; 180/245, 233, 248–251

(56) References Cited

U.S. PATENT DOCUMENTS

| | | | |
|---|---|---|---|
| 3,390,593 A | 7/1968 | Brownyer | |
| 3,546,969 A | 12/1970 | Gibson et al. | |
| 3,587,346 A | * 6/1971 | Takahashi | 475/235 |
| 4,123,951 A | * 11/1978 | Kagata | 475/235 |
| 4,245,525 A | * 1/1981 | Lebegue | 475/235 |
| 4,269,086 A | 5/1981 | Altmann | |
| 4,290,321 A | * 9/1981 | Wilson | 475/235 |
| 4,305,313 A | * 12/1981 | Konkle | 475/240 |
| 4,305,490 A | 12/1981 | Hendrickson | |
| 4,452,100 A | 6/1984 | Sullivan et al. | |
| 4,557,358 A | 12/1985 | Petrak | |
| 4,730,514 A | 3/1988 | Shikata et al. | |
| 5,037,362 A | * 8/1991 | Teraoka et al. | 475/235 |
| 5,045,038 A | * 9/1991 | Sherlock | 475/235 |
| 5,059,160 A | 10/1991 | Raniero | |
| 5,520,272 A | 5/1996 | Ewer et al. | |
| 5,582,557 A | 12/1996 | Dissett et al. | |
| 5,741,199 A | * 4/1998 | Tanser et al. | 475/235 |

* cited by examiner

Primary Examiner—Daniel G. DePumpo
Assistant Examiner—Matthew Luby
(74) Attorney, Agent, or Firm—Liniak, Berenato & White

(57) ABSTRACT

A differential assembly having a preload or biased differential case. A beveled thrust washer is disposed between each side gear and the differential case. The beveled thrust washer induces a preload between the side gear and differential case to help ensure that each differential side gear and output half shaft are running at the same speed as the differential case is rotated. The preload or bias is set to be slightly greater than the difference in drag forces acting on each output half shaft. Thus, when the transfer case is engaged to bring the differential case up to speed, the differential gears will be prevented from spinning and the output half shafts will rotate at the same speed coincident with the vehicle road speed. The preload facilitates more desirable engagement of the wheeled hublocks in front wheel steerable wheel axle assemblies in selectable four-wheel drive trains.

4 Claims, 3 Drawing Sheets

DIFFERENTIAL ASSEMBLY WITH SYNCHRONIZING PRELOAD

FIELD OF THE INVENTION

The present invention relates to a differential assembly and more particularly to a differential assembly having a biasing preload to synchronize shaft speeds.

DESCRIPTION OF THE RELATED ART

Differential assemblies are well known in the art. In differential assemblies driving rear mounted axles, a limited slip device may be incorporated to limit the amount of differential speed rotation of the output shafts. Commonly a multiple-disc clutch pack is disposed between one or each of the side gears and the differential case. The differential case may have axial grooves or splines to prevent rotation and allow axial displacement of friction discs of the clutch pack. Similarly, clutch plates may be splined onto the side gears and interposed between the friction discs. A spring is normally disposed between the side gears to urge the side gears apart and cause frictional engagement in the clutch pack. The friction between the friction discs and clutch plates limits the amount that the side gears may slip relative to the differential case. A gerrotor pump or other hydraulic pumping mechanism may also be employed to selectively control the clutch pack. However, a limited slip device is undesirable and unnecessary in differential assemblies arranged in axle assemblies driving steerable wheels. Rather, differential assemblies in front steerable wheel end assemblies employ a traditional differential assembly. Note FIGS. 2–4 which show a conventional standard differential assembly with a flat thrust washer disposed between the side gears and differential case. These flat thrust washers are machined to within fine tolerances to ensure that no preload is induced to the differential case.

In four wheel drive axles assemblies it is desirable to selectively engage the front steerable axle shafts. Normally the rear axle assembly is constantly driven and the front axle assembly is selectively driven during four-wheel drive conditions. Typically, a transfer case is employed to transfer driving torque from the drive shaft to the front axle assembly. Once the transfer case is engaged and the front differential case driven, the wheel hub locks are engaged to complete the four-wheel drive path.

Ideally, in perfect conditions when the transfer case is engaged and brings the front axle differential case up to speed, both half shafts will be spinning at road speed coincident with the wheel end hub. The wheel end hublocks may then be engaged to commence four-wheel drive. However, in differential assemblies, there is inherently an unequal drag force on one of the side gears relative to the other side gear. Therefore, when the transfer case engages the front axle assembly to drive the differential case, the half shafts will rotate at different speeds. The extreme case is where one half shaft remains stationery while the other half shaft rotates at twice road speed. Consequently, it is difficult to engage the wheel end hublocks and may result in ratching of gears and splined teeth when the hublocks are engaged. Therefore, it is desirable to ensure each differential side gear and half shaft are running at the same speed when the wheel end hublocks are engaged without employing an undesirable conventional limited slip device.

SUMMARY OF THE INVENTION

The object of the present invention is to add some pre-load or bias to a standard differential case. If the bias in the differential case is greater than the difference in drag forces acting on the side gears it will prevent the differential gears from spinning thereby ensuring that both half shafts are rotating at the same speed. Having both half shafts rotating at the same speed will minimize any ratching of any gears or splined teeth when the hublocks are engaged. A beveled thrust washer is disposed directly between each side gear and the differential case. The beveled thrust washer induces a preload between the side gears and the differential case. The preload is sufficient to overcome any differences in drag forces acting on the output shafts. Consequently, when the transfer case in engaged to bring the differential case up to speed, the output shafts will rotate at the same speed coincident with vehicle running speed. Thus, the wheel end hublocks may be engaged.

DETAILED DESCRIPTION OF THE PREFERRED EMBODIMENT

Figure 5:
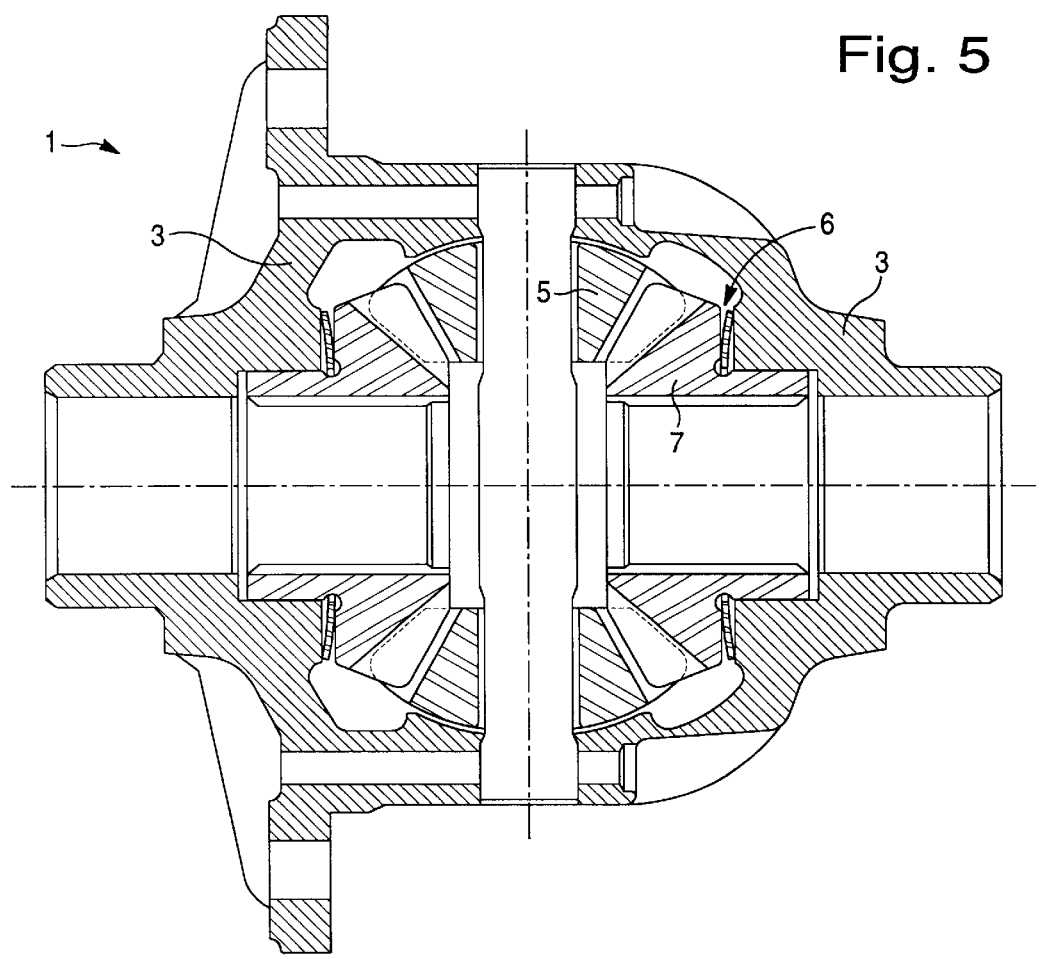
FIG. 5 is a partial sectional view of the differential assembly according to the present invention.

The present invention provides the ability to synchronize shafts speeds as the differential case is brought up to speed when shifting from two-wheel drive to four-wheel drive. Referring to FIG. 5, a differential assembly 1 includes a differential case 3 having pinion gears 5 and side gears 7 disposed therein to provide differential torque transfer to a pair of output shafts (not shown) which are fixed to the side gears 7. In front wheel steerable axle assemblies it is undesirable and impracticable to employ a limited slip device. However, a small amount of bias or preload to the differential case is desired to facilitate equal rotational speed of the output shafts when shifting from two-wheel drive to four-wheel drive. This preload is induced by replacing the prior art flat thrust washer with a beveled trust washer 6. A pair of beveled thrust washers 6 are disposed directly between the side gears 7 and the differential case 3. The beveled thrust washer 6 ensures that there is some frictional engagement between the side gears 7 and the differential case 3 sufficient to overcome any difference in drag forces between the two side gears 7. The space between the side gears 7 and differential case 3 is slightly exaggerated to demonstrate the difference over the prior art devices. The dimensions of the beveled thrust washer 6 is chosen to induce a slight preload just enough to overcome any difference in drag forces as previously mentioned. The beveled thrust washer 6 may be made of material similar to conventional thrust washers such as steel.

Figure 6:
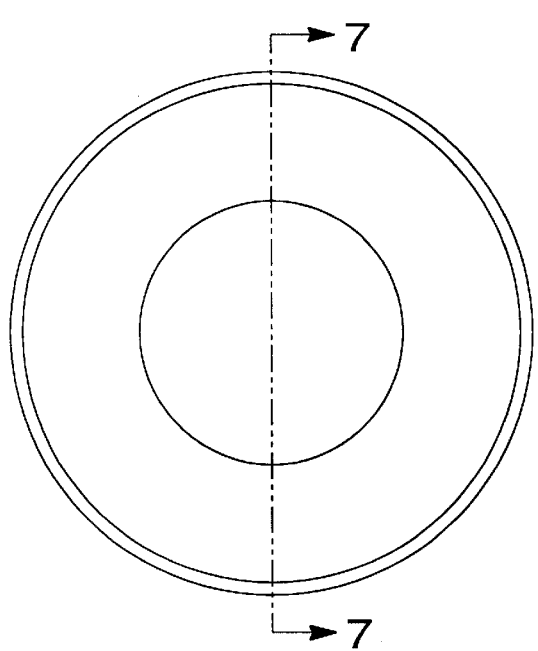
FIG. 6 is front view of a beveled thrust washer employed in the differential assembly of FIG. 5.
Figure 7:
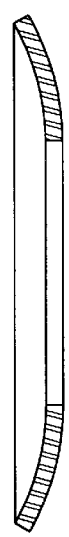
FIG. 7 is a sectional view of the beveled thrust washer taken along line 7—7 of FIG. 6.

FIG. 6 depicts a front view of the beveled thrust washer 6 and FIG. 7 is a sectional view of the same beveled thrust washer 6. The beveled thrust washer 6 has an axially oriented bevel to provide a biasing force, or preload, between the side gears 7 and the differential case 3. This pre-load induces some frictional force between the side gears 7 and the differential case 3 to ensure that each side gear 7 and associated output shaft 111*a*, 111*b* rotate at substantially equal speeds as the differential case 3 is rotated prior to locking the hub locks as will be explained below.

Figure 1:
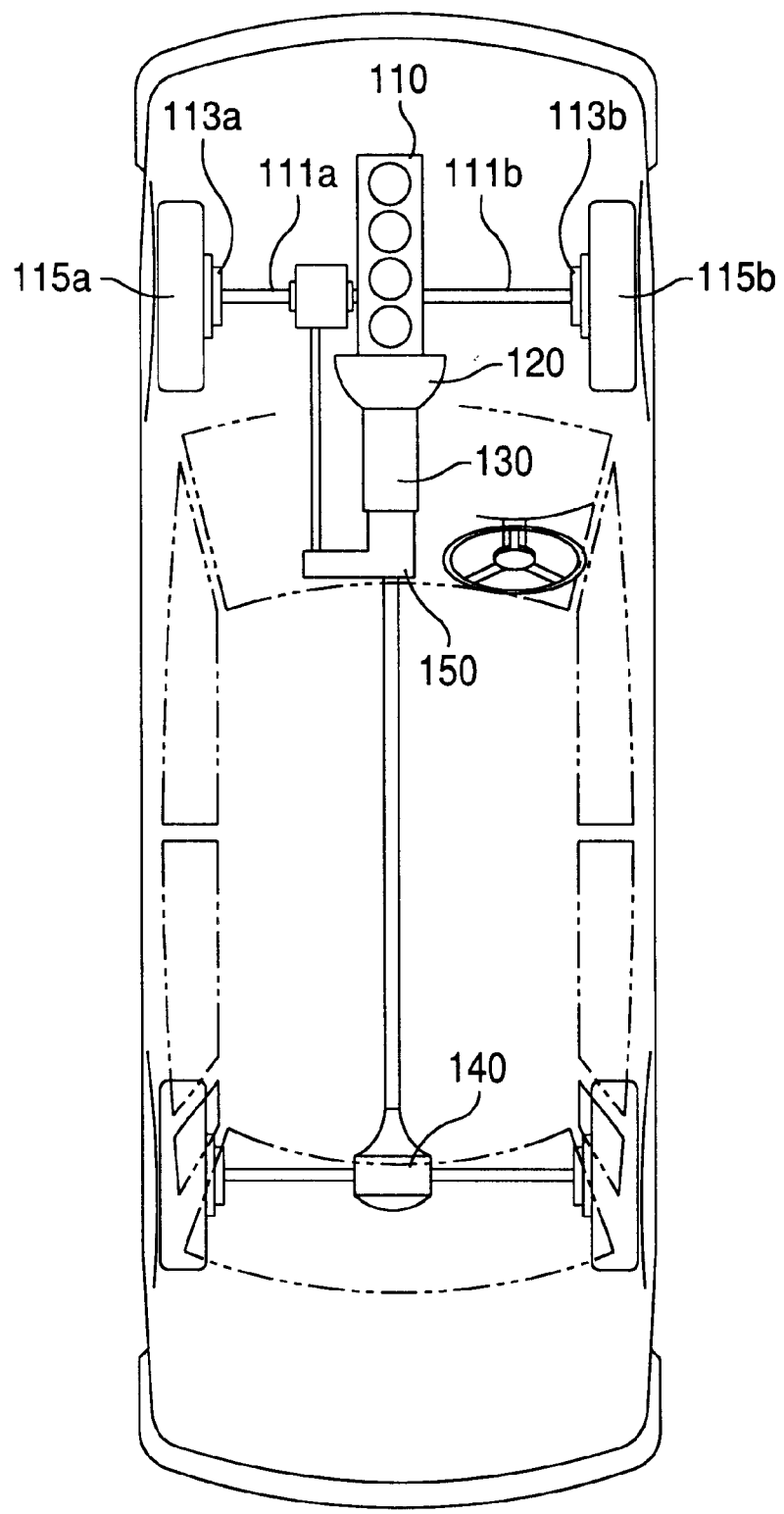
FIG. 1 is a schematic view of a vehicle having a steerable front wheel drive train assembly incorporating the differential assembly of the present invention.
Figure 2:
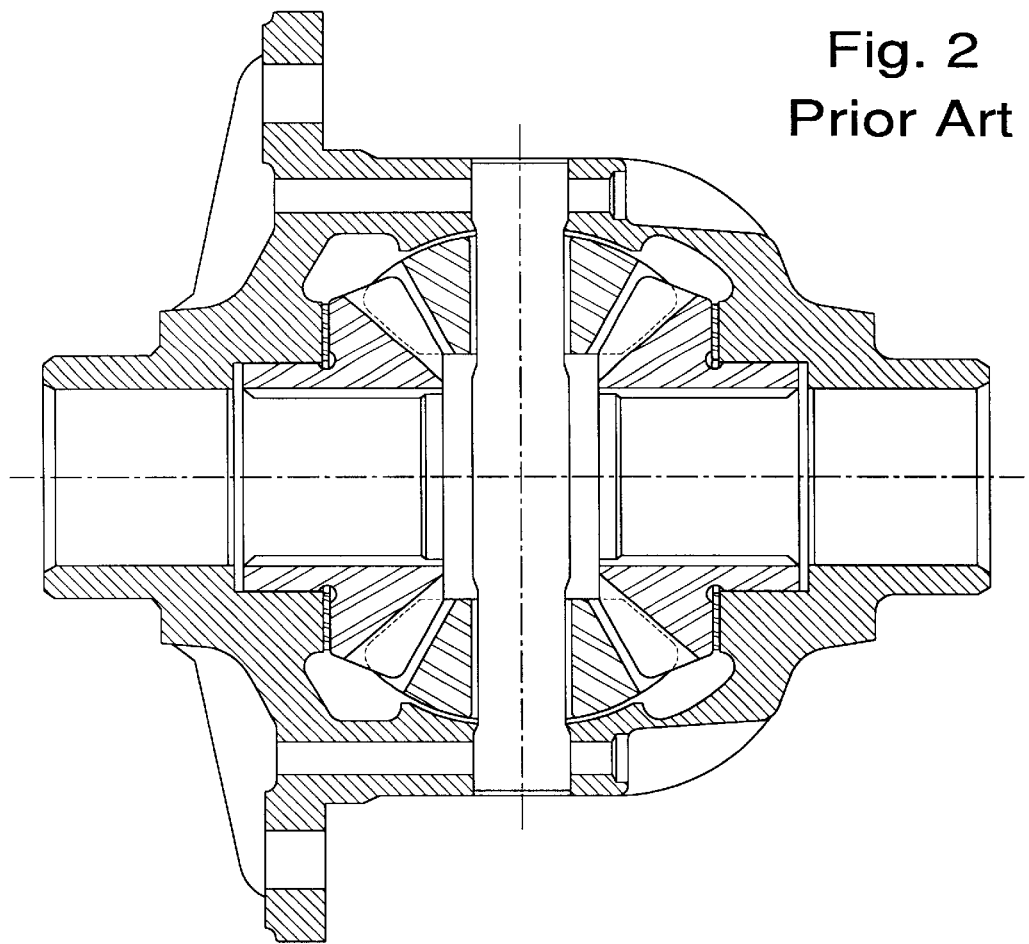
FIG. 2 is a partial sectional view of a conventional standard differential axle assembly.
Figure 3:
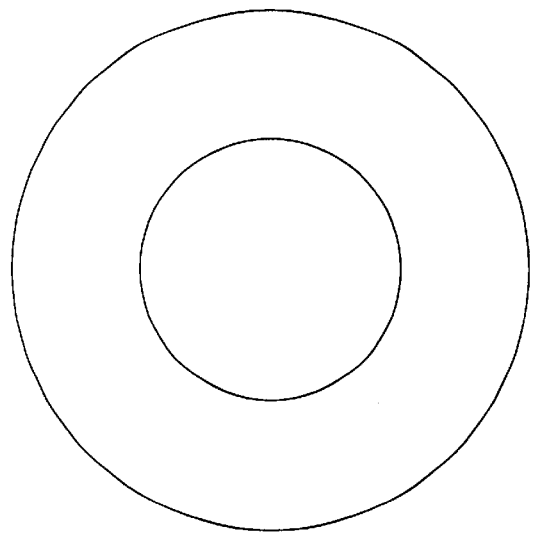
FIG. 3 is front view of a thrust washer employed in FIG. 2
Figure 4:
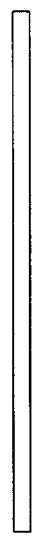
FIG. 4 is side view of the thrust washer of FIG. 4.

FIG. 1 is a schematic view of a vehicle employing the differential assembly 1 of the present invention. An engine 110 is connected to a torque converter 120 and automatic transmission 130 which in turn drives a transfer case 150. The transfer case 150 continuously transfers driving torque from the transmission 130 to a rear axle assembly and rear differential assembly 140 via a rear drive shaft. The transfer case 150 selectively transfers driving torque to the front differential 1, via a front drive shaft, when four-wheel drive is implemented. A pair of output shafts 111*a*, 111*b* are each drivingly connected to a corresponding one of the side gears 7 of the differential assembly 1. A pair of steerable wheel ends 115*a*, 115*b* are provided as is known in the art. A pair of wheel end hublocks are also provided to selectively establish a driving connection and disconnect between the output shafts 111*a*, 111*b* and the corresponding wheel ends 115*a*, 115*b*. The wheel end hublocks are schematically represented by reference numerals 113*a*, 113*b*. It is noted that wheel end hubs locks 113*a*, 113*b*, the steering connection between the wheel ends 115*a*, 115*b* and the vehicle, and the transfer case 150 arrangement are well known in the art and are not shown or described in detail. It is to be understood that the transmission 130, transfer case 150, and front wheel steerable connection and associated hub locks 113*a*, 113*b* well known in the art may be employed with the synchronized differential assembly 1 of the present invention.

During two wheel driving conditions, the transfer case 150 continuously transfers driving torque from the transmission output to the rear differential assembly 140 and does not transfer driving torque to the front differential assembly 1. The wheel end hub locks 113*a*, 113*b* are unlocked to establish a driving disconnect between the wheel ends 115*a*, 115*b* and the output shafts 111*a*, 111*b*. Consequently, during two-wheel driving conditions the differentia case 1, side gears 7 and associated output shafts 111*a*, 111*b* remain stationary.

When shifting from two wheel drive to four wheel drive, a driving connection must be established between the transmission and the front differential 1 and between the wheel ends 115*a*, 115*b* and associated output shafts 111*a*, 111*b*. The transfer case 150 is activated to transfer driving torque to the front differential assembly 1 as is known in the art. Once this driving torque is transferred, the differential case 3 is brought up to speed. In the prior art differential assemblies, unequal drag forces acting on the side gears results in unequal rotation speed between each side gear and associated output shaft. Consequently, the output shafts will not be rotating at the same speed as the wheel ends during driving conditions. Therefore, activation of the hub locks may cause ratching of the gears and splined teeth. In the most drastic case, one side gear and output shaft will be rotating at twice road speed while the other side gear and output shaft will remain stationary.

The differential assembly 1 of the present invention helps ensure that each side gear 7 and associated output shaft 111*a*, 111*b* rotate at substantially the same speed as the differential case 3 is brought up to speed when the transfer case 150 is engaged. Consequently, the output shafts 111*a*, 111*b* will rotate substantially coincident with the wheel ends 115*a*, 115*b*. This arrangement facilitates locking of the wheel end hublocks 113*a*, 113*b* to complete the four-wheel driving connection to the front wheel ends 115*a*, 115*b*. Therefore, a smoother shift from two wheel drive to four wheel drive results and wear on the hub lock and the remaining components of the front wheel axle assembly is reduced.

While the foregoing invention has been shown and described with reference to a preferred embodiment, it will be understood by those possessing skill in the art that various changes and modifications may be made without departing from the spirit and scope of the invention. For example, while the present invention has been shown in combination with an automatic transmission, a manual transmission may also be employed. Moreover, the present invention is not limited to any specific streerable wheel end connection, hub lock or transfer case. So long as the hublocks may selectively establish a driving connection and disconnect between the wheel end and the output shafts during implementation and deactivation of four-wheel driving conditions, many well known devices may be employed. Lastly, the present invention may not be limited to the beveled thrust washer shown and described. Other modifications are contemplated by the present invention where a front steerable wheel axle assembly has a differential with sufficient pre-load or bias between the side gears and differential case to overcome any unequal drag forces. A plurality of biased thrust washers inducing a preload between the side gears and differential is also contemplated.

What is claimed is:

1. A differential axle assembly comprising:
   a differential case;
   a gear assembly rotatably disposed within said differential case to provide differential torque transfer to a pair of output shafts, said gear assembly including a pair of side gears mounted rotatably about an axis of rotation and fixed to a corresponding one of said output shafts;
   a beveled thrust washer disposed directly between each of said side gears and said differential case provided to induce a preload between said side gears and said differential case.

2. The differential assembly according to claim 1, wherein said outputs are each fixed to a corresponding one of said side gears; said assembly further comprising:
   a pair of steerable wheel ends one each selectively connected to a corresponding one of said output shafts;
   wherein when said output shafts are disconnected from said wheel ends said output shafts rotate at substantially equal speed when said differential case is rotated.

3. A four-wheel drive assembly comprising:
   a transmission for driving said four-wheel drive assembly;
   a transfer case for selectively transferring driving torque from said transmission to a front axle assembly and continuously transferring driving torque to a rear axle assembly;
   said rear axle assembly including;
      a rear differential;
      a rear drive shaft disposed between said transfer case and said rear differential;
   said front axle assembly including;
      a front differential assembly
      a front drive shaft disposed between said transfer case and said front differential assembly for selectively delivering driving torque thereto;
   said front differential assembly including
      a gear assembly rotatably disposed within a differential case to provide differential torque transfer between a pair of output shafts, said gear assembly including a pair of side gears mounted rotatably about an axis of rotation, said side gears each fixed to a corresponding one of said output shafts, said output shafts being connected to a pair of steerable wheels through a wheel end hub-lock to facilitate selectable connection there between; and a beveled thrust washer disposed between each of said side gears and said differential case to thereby induce a preload between said side gears and said differential case said preload being greater than a difference in drag forces acting on said output shafts such that when said differential case is rotated when said wheel end hub locks are disconnected, said output shafts rotate at substantially equal speed.

4. A combination differential axle assembly with a steerable wheel end assembly, said combination comprising:

a differential case;

a gear assembly rotatably disposed within said differential case to provide differential torque transfer to a pair of output shafts, said gear assembly including a pair of side gears mounted rotatably about said axis of rotation and fixed to a corresponding one of said output shafts;

a beveled thrust washer disposed directly between each of said side gears and said differential case provided to induce a preload between said side gears and said differential case;

a pair of steerable wheel ends selectively connected to a corresponding one of said output shafts trough a pair of hub-locks to selectively establish a driving connection there between; wherein when said output shafts are disconnected from said steerable wheel ends said output shafts rotate at substantially equal speed when said differential case is rotated.

* * * * *